US012641316B2

(12) United States Patent
Choi et al.

(10) Patent No.: US 12,641,316 B2
(45) Date of Patent: May 26, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Gippeum Choi, Suwon-si (KR); Doil Kwon, Suwon-si (KR); Myungjae Kim, Suwon-si (KR); Jaehwang Lee, Suwon-si (KR); Minseok Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/791,991

(22) Filed: Aug. 1, 2024

(65) Prior Publication Data

US 2025/0080803 A1 Mar. 6, 2025

Related U.S. Application Data

(63) Continuation of application No. PCT/KR2024/008533, filed on Jun. 20, 2024.

(51) Int. Cl.

| | |
|---|---|
| ***H04N 21/4722*** | (2011.01) |
| ***H04N 21/439*** | (2011.01) |
| ***H04N 21/44*** | (2011.01) |
| ***H04N 21/4788*** | (2011.01) |

(52) U.S. Cl.

CPC ..... *H04N 21/4722* (2013.01); *H04N 21/4394* (2013.01); *H04N 21/44008* (2013.01); *H04N 21/4788* (2013.01)

(58) Field of Classification Search

CPC .......... H04N 21/4722; H04N 21/4394; H04N 21/44008; H04N 21/4788

See application file for complete search history.

(56) References Cited

U.S. PATENT DOCUMENTS

| | | | | |
|---|---|---|---|---|
| 8,929,657 | B2 | 1/2015 | Jung | |
| 8,997,007 | B1 * | 3/2015 | Bennett | H04N 21/41407 715/753 |
| 9,202,523 | B2 | 12/2015 | Ryu et al. | |
| 9,516,254 | B2 * | 12/2016 | Kim | G08C 23/04 |
| 9,792,285 | B2 * | 10/2017 | Reiley | G06F 16/41 |

(Continued)

FOREIGN PATENT DOCUMENTS

| | | | |
|---|---|---|---|
| JP | 2011-101229 | A | 5/2011 |
| JP | 6967089 | B2 | 11/2021 |

(Continued)

OTHER PUBLICATIONS

Written Opinion issued on Oct. 18, 2024 for International Application No. PCT/KR2024/008533.

(Continued)

*Primary Examiner* — Fernando Alcon

(74) *Attorney, Agent, or Firm* — STAAS & HALSEY LLP

(57) ABSTRACT

An electronic apparatus includes a communicator configured to receive data corresponding to content, a memory and at least one processor, and the at least one processor is configured to, based on a chatting service being present that is related to the content based on the received data, control to output an image including text information related to the content and a highlighted time point identified based on at least one of an image corresponding to the content and an audio corresponding to the content.

15 Claims, 20 Drawing Sheets

(56) References Cited

U.S. PATENT DOCUMENTS

| | | | | |
|---|---|---|---|---|
| 10,034,053 | B1 * | 7/2018 | Trollope | H04H 60/40 |
| 11,232,645 | B1 * | 1/2022 | Roche | G06V 20/20 |
| 11,514,910 | B2 | 11/2022 | Hashimoto et al. | |
| 11,558,666 | B2 | 1/2023 | Park | |
| 2011/0018979 | A1 | 1/2011 | Ota et al. | |
| 2015/0256633 | A1 * | 9/2015 | Chand | H04L 65/765 382/103 |
| 2016/0277802 | A1 * | 9/2016 | Bernstein | H04N 21/44213 |
| 2017/0214954 | A1 * | 7/2017 | Trollope | H04N 21/251 |
| 2017/0311040 | A1 * | 10/2017 | Barnes | H04N 21/4334 |
| 2019/0273972 | A1 * | 9/2019 | Soderbergh | H04N 21/23424 |
| 2019/0296844 | A1 * | 9/2019 | Corder | H04N 21/43074 |
| 2021/0258643 | A1 | 8/2021 | Park | |
| 2022/0377403 | A1 * | 11/2022 | Lu | H04N 21/4312 |
| 2023/0101319 | A1 * | 3/2023 | Ramachandiran | H04N 21/858 725/32 |
| 2023/0276102 | A1 * | 8/2023 | Chen | G06T 7/70 725/34 |

FOREIGN PATENT DOCUMENTS

| | | |
|---|---|---|
| KR | 10-2009-0073944 | 7/2009 |
| KR | 10-1265960 | 5/2013 |
| KR | 10-1380783 | 4/2014 |
| KR | 10-1644789 | 8/2016 |
| KR | 10-2030803 | 11/2019 |
| KR | 10-2020-0001153 | 1/2020 |
| KR | 10-2020-0014487 | 2/2020 |
| KR | 10-2021-0105558 | 8/2021 |
| KR | 10-2324302 | 11/2021 |
| KR | 10-2400166 | 5/2022 |
| WO | WO 2022/250439 A1 | 12/2022 |

OTHER PUBLICATIONS

International Search Report issued on Oct. 18, 2024 for International Application No. PCT/KR2024/008533.

* cited by examiner

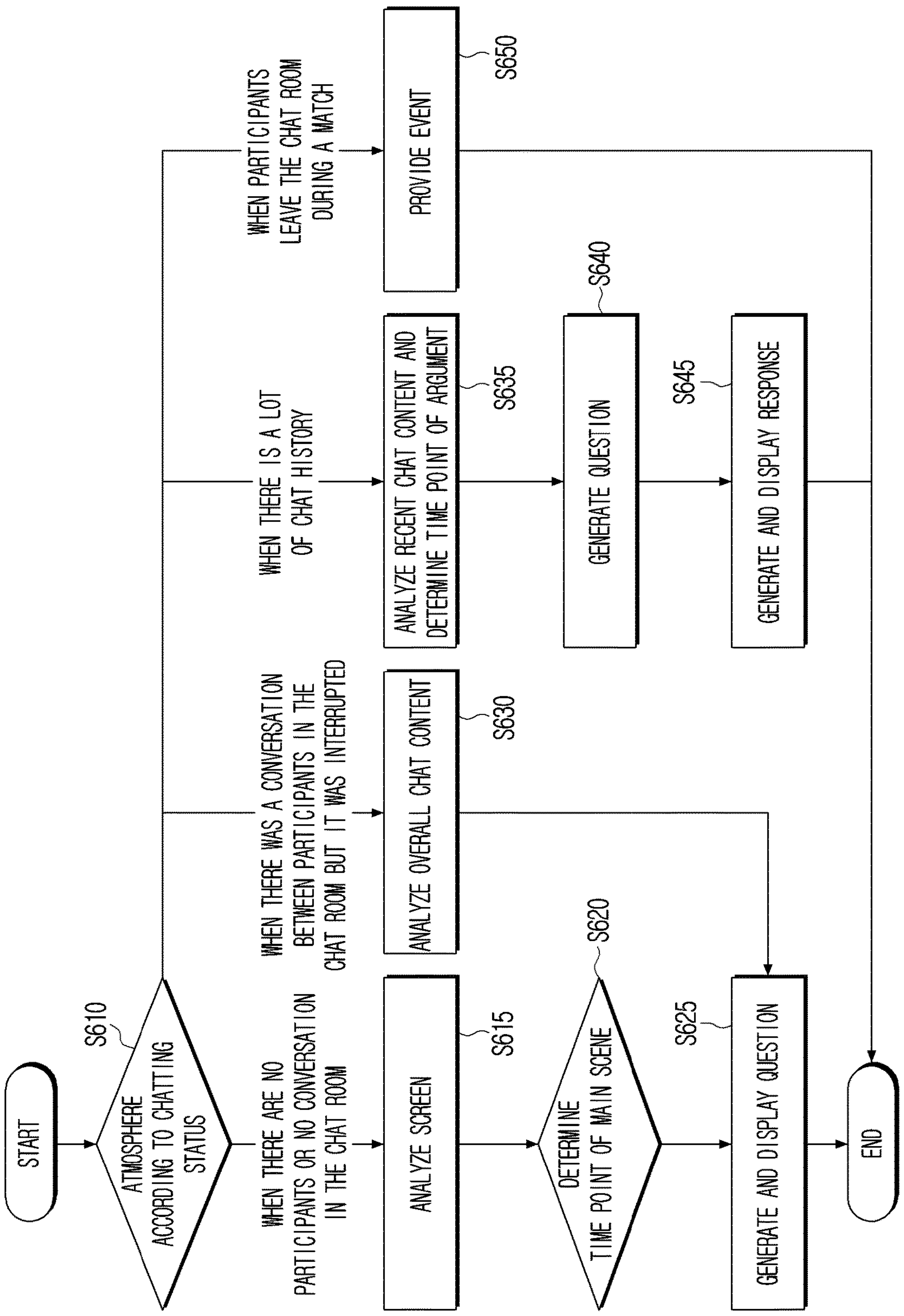

FIG. 6

START

S610 ATMOSPHERE ACCORDING TO CHATTING STATUS

WHEN THERE ARE NO PARTICIPANTS OR NO CONVERSATION IN THE CHAT ROOM

S615 ANALYZE SCREEN

S620 DETERMINE TIME POINT OF MAIN SCENE

S625 GENERATE AND DISPLAY QUESTION

WHEN THERE WAS A CONVERSATION BETWEEN PARTICIPANTS IN THE CHAT ROOM BUT IT WAS INTERRUPTED

S630 ANALYZE OVERALL CHAT CONTENT

WHEN THERE IS A LOT OF CHAT HISTORY

S635 ANALYZE RECENT CHAT CONTENT AND DETERMINE TIME POINT OF ARGUMENT

S640 GENERATE QUESTION

S645 GENERATE AND DISPLAY RESPONSE

WHEN PARTICIPANTS LEAVE THE CHAT ROOM DURING A MATCH

S650 PROVIDE EVENT

END

| UTTERANCE | DA(dialog act) |
|---|---|
| <PLAYER NAME>AAA</PLAYER NAME> WHAT IS HIS RECENT BATTING RATE? | DA_HOW |
| WHAT IS THE NAME OF THE PLAYER CURRENT IN THE BATTER'S BOX? | DA_WHO |
| WHAT IS THE NAME OF BATTER? | DA_WHO |
| WHY IS THIS OUT, RATHER THAN SAFE? | DA_WHY |
| DO YOU THINK THIS TIME IT WILL BE HOME RUN? | DA_ASK |
| WHAT HAPPENED JUST BEFORE? | DA_WHAT |
| <PALYER NAME>AAA</PLAYER NAME> WHEN DID HE MOVE? | DA_WHEN |
| <PALYER NAME>AAA</PLAYER NAME> WHEN DID HE HIT HOME RUN? | DA_WHEN |
| A LOT OF AUDIENCES CAME | DA_PLAIN |

| UTTERANCE (1510) | USER ACTION (User Goal) (1520) | NE (Named Entity) (1530) |
|---|---|---|
| <PLAYER NAME>AAA</PLAYER NAME> WHAT IS HIS RECENT BATTING RATE? | UA_HIT_RATE | <PLAYER NAME> = AAA |
| <ROLE>PITCHER<ROLE> WHAT IS HIS NAME? | UA_PLAYER_NAME | <ROLE>=PITCHER |
| WHY IS THIS OUT, RATHER THAN SAFE? | UA_VIDEO_SUMMARY | |
| WHAT HAPPENED JUST BEFORE? | UA_VIDEO_SUMMARY | |

| UA (1610) | NE (1620) | QUERY TEMPLATE (1630) | GENERATED QUERY (1640) |
|---|---|---|---|
| UA_HIT_RATE | <PLAYER NAME> = BBB | <PLAYER NAME>000</PLAYER NAME> TELL ME HIS BATTING RATE (SEARCH PLAYER INFORMATION IN PLAYER DB) | BATTING RATE OF BBB IS 000 |
| UA_VIDEO_SUMMARY | NA | LET ME SHOW YOU PREVIOUS GAME SCENE AGAIN (DISPLAY LINK TO PREVIOUS VIDEO IMAGE) | LET ME SHOW YOU PREVIOUS GAME SCENE AGAIN (DISPLAY LINK TO PREVIOUS VIDEO IMAGE) |
| UA_PLAYER_NAME | <ROLE> =BATTER | <ROLE> LET ME TELL YOU HIS NAME<br>(SEARCH PLAYER NAME IN PLAYER DB USING BACK NUMBER OF PLAYER RECOGNIZED IN SCREEN.)<br><ROLE> HIS NAME IS <PLAYER_NAM> | BATTER'S NAME IS BBB |

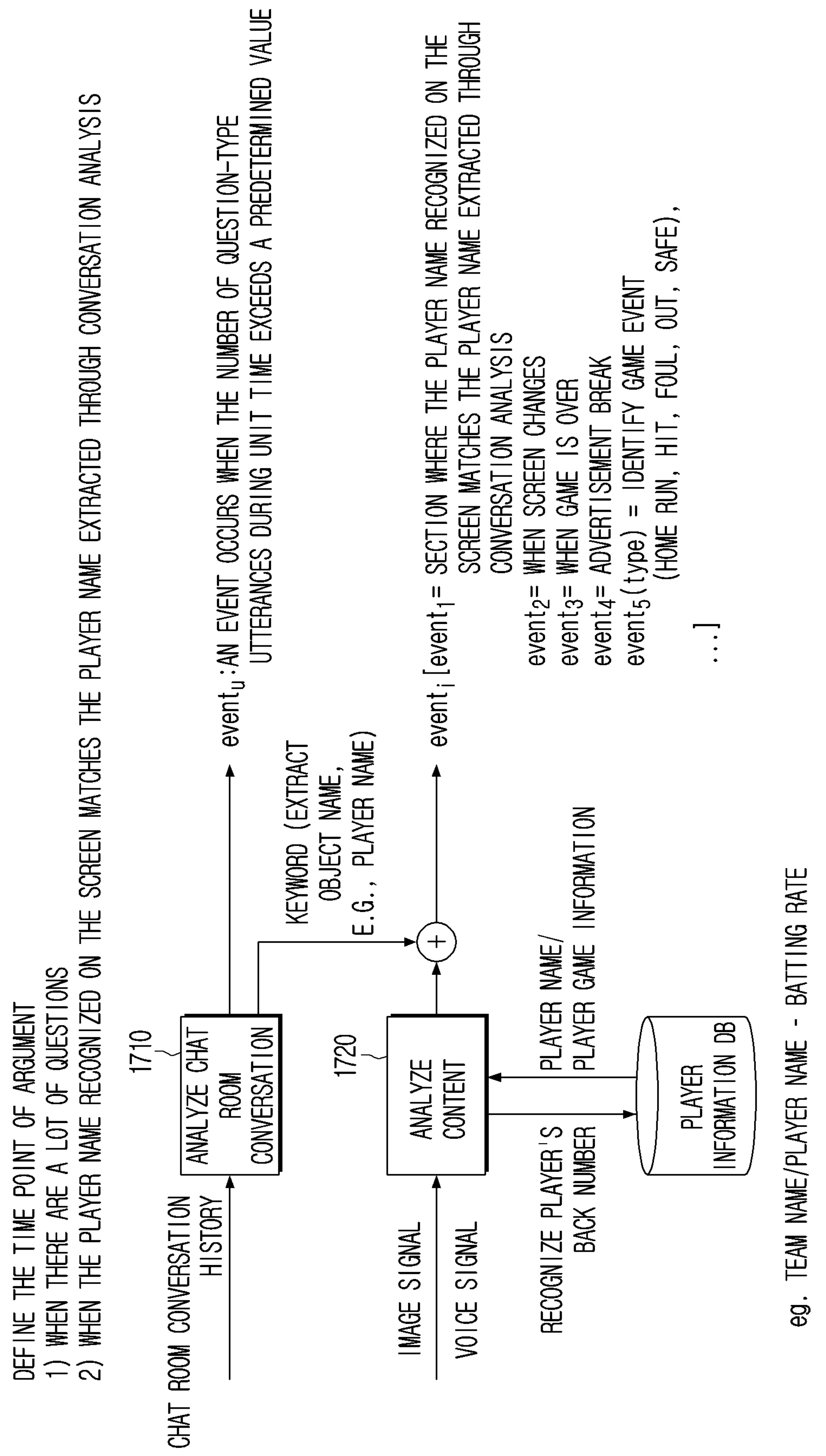

FIG. 17

CHAT ROOM CONVERSATION
HISTORY

1710 — ANALYZE CHAT ROOM CONVERSATION

DEFINE THE TIME POINT OF ARGUMENT
1) WHEN THERE ARE A LOT OF QUESTIONS
2) WHEN THE PLAYER NAME RECOGNIZED ON THE SCREEN MATCHES THE PLAYER NAME EXTRACTED THROUGH CONVERSATION ANALYSIS $event_u$ : AN EVENT OCCURS WHEN THE NUMBER OF QUESTION-TYPE UTTERANCES DURING UNIT TIME EXCEEDS A PREDETERMINED VALUE

KEYWORD (EXTRACT OBJECT NAME, E.G., PLAYER NAME)

1720 — ANALYZE CONTENT

IMAGE SIGNAL
VOICE SIGNAL

RECOGNIZE PLAYER'S BACK NUMBER

PLAYER NAME/ PLAYER GAME INFORMATION

PLAYER INFORMATION DB eg. TEAM NAME/PLAYER NAME - BATTING RATE $event_i$ [$event_1$ = SECTION WHERE THE PLAYER NAME RECOGNIZED ON THE SCREEN MATCHES THE PLAYER NAME EXTRACTED THROUGH CONVERSATION ANALYSIS $event_2$ = WHEN SCREEN CHANGES
$event_3$ = WHEN GAME IS OVER
$event_4$ = ADVERTISEMENT BREAK
$event_5$(type) = IDENTIFY GAME EVENT
(HOME RUN, HIT, FOUL, OUT, SAFE),

| Poll type | Extract chat room keyword | Recognize screen | Example |
|---|---|---|---|
| Predict match result | Section with a lot of team cheering phrases | • Game broadcasting begins<br>• Tie situation | Today's winning team?<br>○ HH (11 people)<br>○ KK (26 people) |
| Predict player record | Express expectation for particular player/director | Particular player appears in pitcher/batter's box | What is the maximum ball velocity of Moon Dong-Ju today?<br>○ 162 (select 9 people)<br>○ 163 (select 0 people)<br>○ 164 (select 2 people) |
| Reason for defeat | • Negative expression for particular player/director<br>• History of mentioning the player who made a mistake previously | • N minutes before game over<br>• Recognize winning/losing team | What is the reason for defeat of KK?<br>○ BBB (20 people)<br>○ CCC (6 people) |
| Reason for victory /MVP | Positive expression for particular player/director | • N minutes before game over<br>• Recognize winning/losing team | If you have to choose one of these people as MVP?<br>○ BBB (20 people) |

ELECTRONIC APPARATUS AND CONTROLLING METHOD THEREOF

CROSS-REFERENCE TO RELATED APPLICATION

This application is a continuation application, under 35 U.S.C. § 111(a), of international application No. PCT/KR2024/008533, filed on Jun. 20, 2024, which claims priority under 35 U.S.C. § 119 to Korean Patent Application No. 10-2023-0115278, filed Aug. 31, 2023, the disclosures of which are incorporated herein by reference in their entireties.

FIELD

Embodiments of the present disclosure relate to an electronic apparatus and a controlling method thereof and more specifically, to an electronic apparatus that induces chatting participation based on image analysis and/or chat information and a controlling method thereof.

DESCRIPTION OF THE RELATED ART

An electronic apparatus generates and displays an image, or provides an image to a display device that displays the image. As described above, such an electronic apparatus is capable of not only displaying specific content selected by the user, but also displaying various information.

Recent electronic apparatuses offer chatting services. These chatting services allow users to have conversations and, more recently, allow users watching the same content to share various opinions while watching the content.

However, many users are still unaware of the availability of these chatting services on their electronic apparatuses, and in some cases, they are unaware of the availability of chatting services for the content they are currently watching.

SUMMARY

An electronic apparatus according to an embodiment includes a communicator configured to receive data corresponding to content, a memory and at least one processor, and the at least one processor is configured to, based on a chatting service being present that is related to the content corresponding to the data received through the communicator, control outputting of an image including text information related to the content and a highlighted time point identified based on at least one of an image corresponding to the content and an audio corresponding to the content.

The at least one processor may be configured to identify the highlighted time point based on whether the image includes an object of interest of a user, whether the audio includes a predetermined sound, and whether the text information obtained by voice recognition of the audio includes a predetermined text.

The at least one processor may be configured to identify the highlighted time point using at least one of a conversation frequency based on conversation information corresponding to the chatting service obtained through the communicator or whether a predetermined keyword is included.

The at least one processor may be configured to obtain the text information based on at least one of a keyword included in the obtained conversation information, a type of the content, the object of interest, or whether the text information is associated with the conversation information.

The at least one processor may be configured to obtain additional information related to the content based on broadcast information related to the content corresponding to the data received through the communicator, and identify whether the image includes an object of interest of a user based on the obtained additional information.

The at least one processor may be configured to, based on a user input corresponding to selection of the text information or a user input corresponding to execution of the chatting service being received, control to output a UI corresponding to the chatting service with the image.

The UI may include conversation information of another user viewing the content and additional information obtained from a server providing the chatting service.

The additional information may include at least one of a poll related to the content or information regarding an object included in the content.

The text information may include a text in a form of a question.

The apparatus may further include a display, and the at least one processor may be configured to control the display to output the text information at the highlighted time point while an image obtained from an external device is being output on the display with the image obtained from the external device A controlling method of an electronic apparatus according to an embodiment includes receiving data corresponding to content, and based on a chatting service being present that is related to the content corresponding to the data received, outputting an image including text information related to the content and a highlighted time point identified based on at least one of an image corresponding to the content and an audio corresponding to the content.

The method may further include identifying the highlighted time point based on whether the image includes an object of interest of a user, whether the audio includes a predetermined sound, and whether the text information obtained by voice recognition of the audio includes a predetermined text.

The identifying a highlighted time point may include identifying the highlighted time point using at least one of a conversation frequency based on conversation information corresponding to the chatting service or whether a predetermined keyword is included.

The method may further include obtaining the text information based on at least one of a keyword included in the obtained conversation information, a type of the content, the object of interest, or the text information.

The method may further include obtaining additional information related to the content based on broadcast information related to the content obtained through the communicator, and identifying whether the image includes an object of interest of a user based on the obtained additional information.

The method may further include, based on a user input corresponding to selection of the text information or a user input corresponding to execution of a chatting service being received, outputting a UI corresponding to the chatting service with the image.

The UI may include conversation information of another user viewing the content and additional information obtained from a server providing the chatting service.

The additional information may include at least one of a poll related to the content or information regarding an object included in the content.

The text information may include a text in a form of a question.

In a non-transitory computer readable recording medium that stores a program for executing a controlling method of an electronic apparatus, the controlling method includes receiving data corresponding to content, and based on a chatting service related to the content based on the received data being present, outputting an image including text information related to the content and a highlighted time point identified based on at least one of an image corresponding to the content and an audio corresponding to the content.

BRIEF DESCRIPTION OF THE DRAWINGS

The above and other aspects, features and benefits of the embodiments of the present disclosure will become apparent from the following description with reference to the accompanying drawings. In the accompanying drawings:

FIG. 6 is a view provided to explain a display operation of different nudge information according to an embodiment;

FIG. 14 is a view illustrating an example of a conversation history according to an embodiment;

FIG. 15 is a view provided to explain an example of generating response information according to an embodiment;

FIG. 16 is a view provided to explain an example of generating response information according to an embodiment;

FIG. 17 is a view provided to explain an operation for identifying timing of nudge information based on a conversation history according to an embodiment;

FIG. 18 is a view illustrating examples of poll content generated based on screen information and keyword information according to an embodiment;

DETAILED DESCRIPTION

Figure 1:
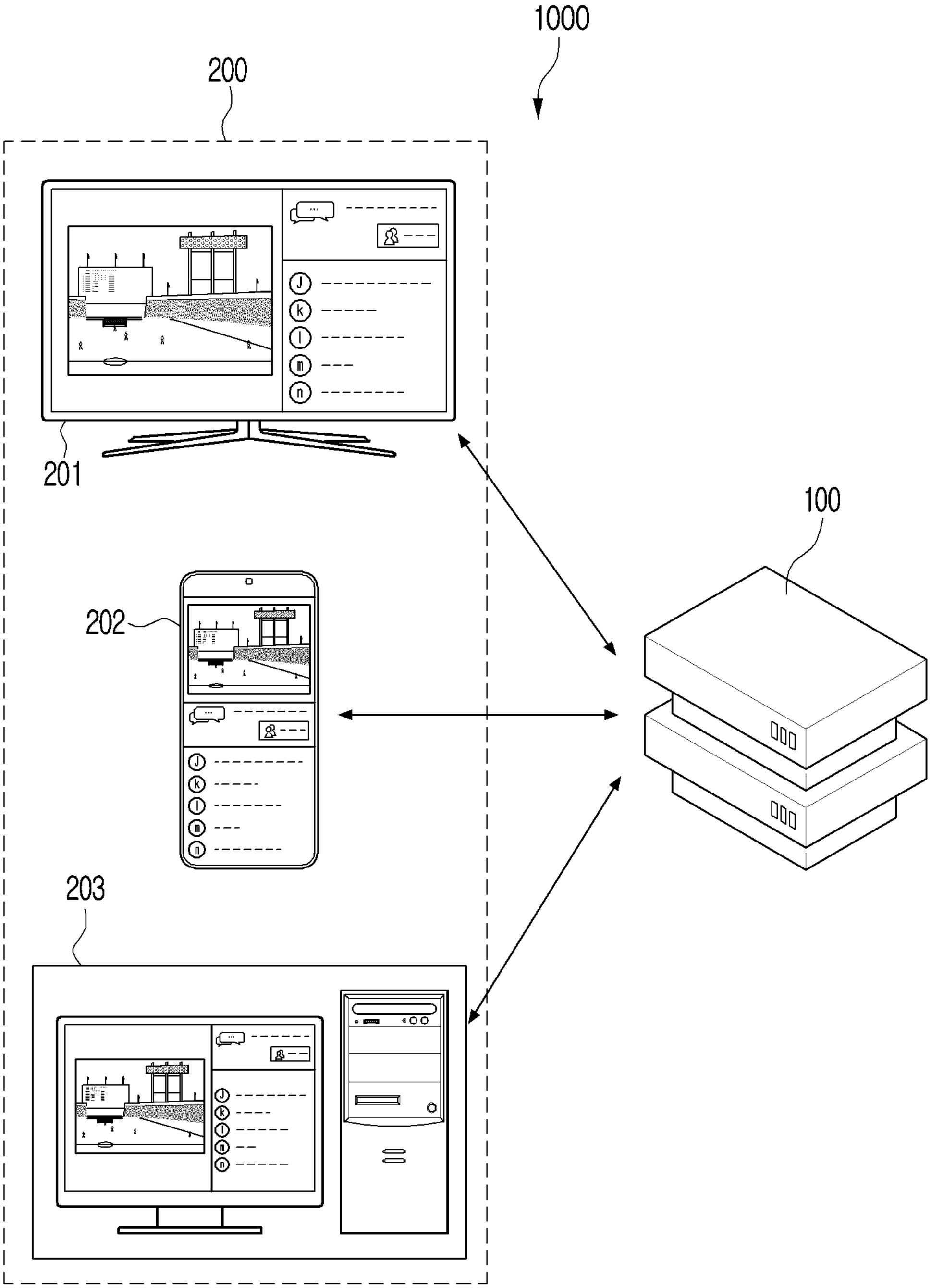
FIG. 1 is a view provided to explain an electronic system according to an embodiment.

Since embodiments of the disclosure may be variously modified and have several examples, specific exemplary embodiments of the disclosure will be illustrated in the drawings and be described in detail in the detailed description. However, it is to be understood that the disclosure is not limited to specific exemplary embodiments, but include all modifications, equivalents, and substitutions according to exemplary embodiments of the disclosure. With respect to the description of the accompanying drawings, similar components may be denoted by similar reference numerals.

In describing the disclosure, when it is decided that a detailed description for the known functions or configurations related to the disclosure may unnecessarily obscure the gist of the disclosure, the detailed description therefor will be omitted.

In addition, the following exemplary embodiments may be modified in several different forms, and the scope and spirit of the disclosure are not limited to the following exemplary embodiments. Rather, these exemplary embodiments make the disclosure thorough and complete, and are provided to completely transfer the spirit of the disclosure to those skilled in the art.

Terms used in the disclosure are used only to describe specific exemplary embodiments rather than limiting the scope of the disclosure. Singular forms are intended to include plural forms unless the context clearly indicates otherwise.

In the disclosure, the expressions “have”, “may have”, “include” and or “may include” used herein indicate existence of corresponding features (e.g., elements such as numeric values, functions, operations, or components) but do not exclude presence of additional features.

In the disclosure, the expressions “A or B”, “at least one of A or/and B”, or “one or more of A or/and B”, and the like may include any and all combinations of one or more of the items listed together. For example, the term “A or B”, “at least one of A and B”, or “at least one of A or B” may refer to all of the case (1) where at least one A is included, the case (2) where at least one B is included, or the case (3) where both of at least one A and at least one B are included.

Expressions “first”, “second”, “$1^{st}$,” “$2^{nd}$,” or the like, used in the disclosure may indicate various components regardless of sequence and/or importance of the components, will be used only in order to distinguish one component from the other components, and do not limit the corresponding components.

When it is described that an element (e.g., a first element) is referred to as being “(operatively or communicatively) coupled with/to” or “connected to” another element (e.g., a second element), it should be understood that it may be directly coupled with/to or connected to the other element or an intervening element (e.g., a third element) may be present.

Conversely, when an element (e.g., a first element) is referred to as being “directly coupled with/to” or “directly connected to” another element (e.g., a second element), it should be understood that there are no intervening element (e.g., a third element).

An expression “~configured (or set) to” used in the disclosure may be replaced by an expression, for example, "suitable for," "having the capacity to," "~designed to," "~adapted to," "~made to," or "~capable of" depending on a situation. A term "~configured (or set) to" may not necessarily mean "specifically designed to" in hardware.

Instead, an expression "~an apparatus configured to" may mean that the apparatus "is capable of" together with other apparatuses or components. For example, a "processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory apparatus.

In exemplary embodiments, a "module" or a "unit" may perform at least one function or operation, and be implemented by hardware or software or be implemented by a combination of hardware and software. In addition, a plurality of "modules" or a plurality of "units" may be integrated in at least one module and be implemented by at least one processor except for a 'module' or a 'unit' that needs to be implemented by specific hardware.

Operations performed by the modules, the programs or other components according to the various embodiments may be executed in a sequential manner, a parallel manner, an iterative manner or a heuristic manner, and at least some of the operations may be performed in a different order or be omitted, or other operations may be added.

Meanwhile, various elements and regions in the drawings are schematically drawn. Therefore, the technical concept of the disclosure is not limited by a relative size or spacing drawn in the accompanying drawings.

Meanwhile, an electronic apparatus according to various embodiments of the present disclosure may include, for example, at least one of smartphone, tablet PC, desktop PC, laptop PC, or wearable device. The wearable device may include at least one of an accessory type of a device (e.g., a timepiece, a ring, a bracelet, an anklet, a necklace, glasses, a contact lens, or a head-mounted-device (HMD), one-piece fabric or clothes type of a circuit (e.g., electronic clothes), a body-attached type of a circuit (e.g., a skin pad or a tattoo), or a bio-implantable type of a circuit.

According to some embodiments, the display apparatus may include at least one of televisions (TVs), digital versatile disc (DVD) players, audios, refrigerators, air-conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like. Meanwhile, among the above-mentioned electronic apparatuses, a device equipped with a display may be referred to as a display device. Meanwhile, the electronic apparatus of the present disclosure may be a set-top box or a PC that provides images to a display device, even if it does not have a display.

Hereinafter, with reference to the accompanying drawings, embodiments according to the present disclosure will be described in detail so that those skilled in the art can easily practice them.

FIG. 1 is a view provided to explain an electronic system according to an embodiment.

An electronic system 1000 may include a server 100. The server 100 may be a device that provides a chatting service. For example, the server 100 may provide a chatting service corresponding to content. Here, the content may be related to various images, such as broadcast content, VOD content, etc.

In addition, the chatting service is a service that enables conversations or information exchanges between various users, and users may enter conversation content through various input methods (e.g., keyboard, voice recognition), and the content of the conversation may be displayed in a chat window of other users.

The specific configuration and operation of the server 100 will described with reference to FIG. 2.

An electronic apparatus 200 may be a device that outputs content or provides an image corresponding to the content to an external device. For example, the electronic apparatus 200 may be a television, laptop, smartphone, tablet PC, or the like that includes a display, or a set-top box, PC, or the like that does not include a display. For convenience of explanation, it is assumed that the electronic apparatus 200 includes a display to display images, but as described above, the electronic apparatus 200 may not include a display and may generate and transmit an image to an external device.

In addition, the electronic apparatus 200 may also display a window corresponding to a chatting service related to the content when providing the content. In addition, the electronic apparatus 200 may, during the display of the image corresponding to the content, display a notification message indicating that a chatting service corresponding to the content exists and requesting participation in the chatting service. Such a notification message may be referred to as a nudge message or the like. In this case, the electronic apparatus 200 may display information (e.g., nudge information) that provokes the user's curiosity, rather than simply indicating that a chatting service exists. Such an embodiment will be described below with reference to FIG. 4.

The specific configuration and operation of the electronic apparatus 200 will be described with reference to FIG. 3.

Meanwhile, in illustrating and describing FIG. 1, the server 100 and a plurality of electronic apparatuses are directly connected to each other, but in implementations, the server 100 and electronic apparatuses 201, 202, 203 may be connected via other devices, such as routers and access points.

Meanwhile, in illustrating and describing FIG. 1, the electronic apparatus 200 includes a display, directly displays an image or displays a screen corresponding to a chatting service, but the electronic apparatus 200 may not directly display an image or chat window, but may generate and provide an image to another electronic apparatus.

Figure 2:
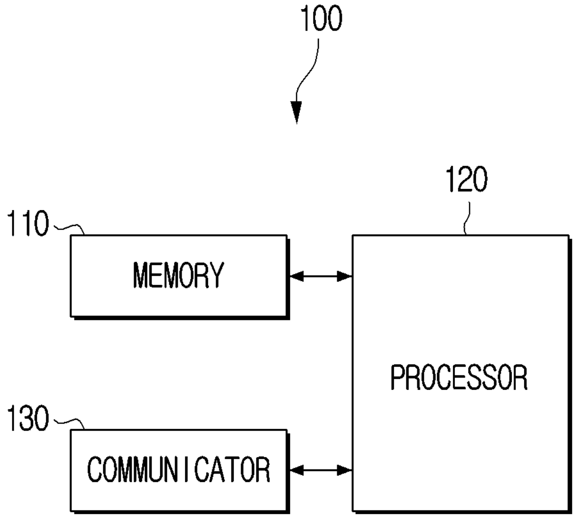
FIG. 2 is a block diagram provided to explain configuration of an electronic apparatus according to an embodiment.

FIG. 2 is a block diagram provided to explain configuration of a server 100 according to an embodiment.

Referring to FIG. 2, the server 100 may include at least one of a memory 110, a processor 120, and a communicator 130.

The processor 120 may perform overall control operations of the server 100. The processor 120 functions to control the overall operations of the server 100.

The processor 120 may obtain the broadcast schedule information, store it in the memory 110, and provide a chatting service for the content based on the broadcast schedule information.

The processor 120 may obtain broadcast schedule information. The broadcast schedule information may include information related to scheduling of content. The broadcast schedule information may include scheduling of content according to various units. The units may include at least one of a monthly unit, a weekly unit, a daily unit, and a one-time delivery unit. The one-time delivery unit may be a unit for representing a schedule that is delivered on a one-time basis, such as a disaster broadcast.

The broadcast schedule information may be schedule information related to the content available in each time zone.

The broadcast schedule information may be information generated by an external server (not shown). The external server may analyze various broadcast schedules to generate broadcast schedule information and provide the same to the server 100.

The processor 120 may store the obtained broadcast schedule information in the memory 110.

The processor 120 may obtain a plurality of broadcast schedule information. One broadcast schedule information may include schedule information related to one content providing device. Since there may be a plurality of content providing devices in an area, there may be a need to analyze schedules for various content providing devices. The processor 120 may obtain a plurality of broadcast schedule information to analyze content provided by the various content providing devices.

The processor 120 may select content for providing the chatting service based on the plurality of broadcast schedule information. In an implementation, it is possible to provide a chatting service corresponding to all broadcast schedules, but it is also possible to generate content for providing a chatting service based on a user's settings (e.g., a specific time of day, a program with a predetermined viewership, etc.).

Once the content to provide the chatting service is determined, the processor 120 may determine the execution time of the chatting service corresponding to the content. For example, it may be determined that the execution time is the same as the time information corresponding to the broadcast schedule, or the execution time is a certain amount of time earlier, a certain amount of time later, or a certain amount of time later than the time information.

The server 100 may further include the communicator 130. The processor 120 may generate access address information corresponding to the chatting service based on a target time and, via the communicator 130, transmit the access address information corresponding to the chatting service to the electronic apparatus.

The access address information may include information for accessing the chatting service. The access address information may include at least one of an Internet address, a network address, or a security code.

The processor 120 may, via the communicator 130, transmit a first screen related to the chatting service to a terminal device, and upon receiving a user input from the electronic apparatus, update the first screen to a second screen based on the user input, and transmit the updated second screen to the electronic apparatus via the communicator 130.

The chatting service may be provided to various electronic apparatuses. The server 100 may provide the chatting service to each of the various electronic apparatuses 201, 202, 203. The processor 120 may provide information related to the chatting service to terminal devices with different communication connections methods.

For example, a first communication interface may be a communication interface that processes RF signals, and a second communication interface may be a communication interface that processes Internet network signals. The processor 120 may utilize different communication connection methods to provide chatting services to different electronic apparatuses.

The operation of providing a chatting service may include an operation of providing a screen related to a chat room.

The processor 120 may determine if it is something for the server 100 to intervene, and may generate questions or additional content in response. For example, the processor 120 may determine that the chat window has low user participation, that a large number of users are participating, that the level of participation in the conversation is low, that participants leave the chatting service, or that there is an argument between a large number of users. Subsequently, the processor 120 may perform operations of creating questions or generating additional information to be reflected in the chat window in response to the above situations.

Here, the additional content may be, for example, poll content related to the content, informational content about objects included in the content, etc. Such examples will be described with reference to FIGS. 11 to 13.

It is recited that the above-described operations are performed in the server 100, which represents a server. According to various embodiments, the above-described operations may be performed in the electronic apparatus 200 itself. Conversely, the operations of the electronic apparatus 200 of FIG. 1 may be performed in the server 100. Specifically, the operations of identifying a highlighted time point and displaying text information at that highlighted time point may be performed by the server.

Figure 3:
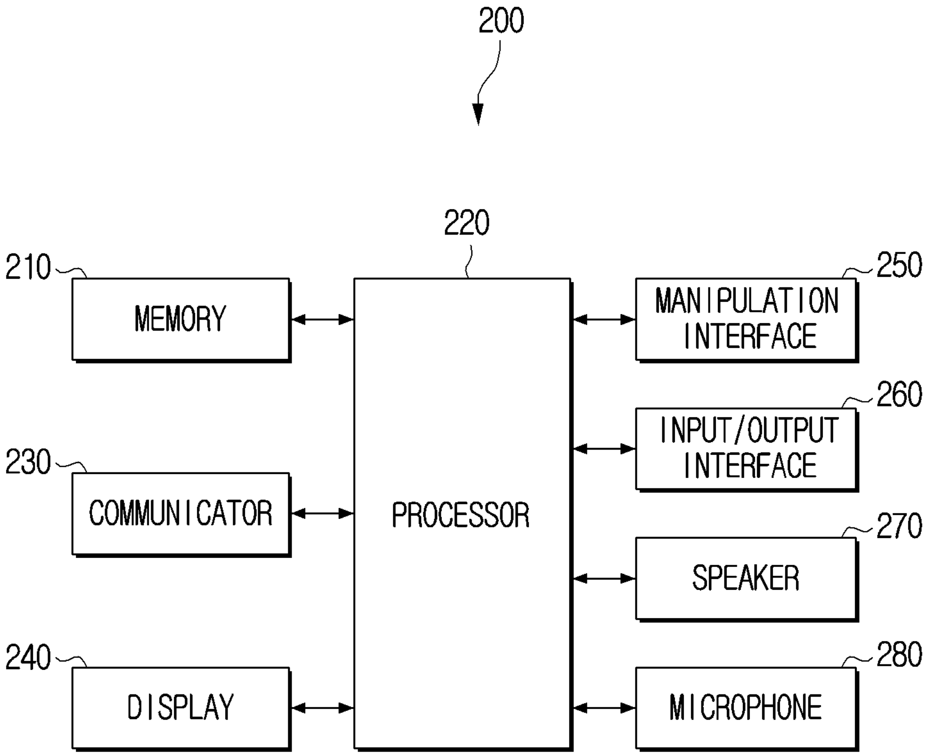
FIG. 3 is a block diagram provided to explain configuration of an electronic apparatus according to an embodiment.

FIG. 3 is a block diagram provided to explain configuration of an electronic apparatus according to an embodiment.

The electronic apparatus 200 may include a memory 210, a processor 220, a communicator 230, a display 240, a manipulation interface 250, an input/output interface 260, a speaker 270, and a microphone 280.

The memory 210 may be implemented as an internal memory such as ROM (e.g., electrically erasable programmable read-only memory (EEPROM)) and RAM included in the processor 220, or may be implemented as a separate memory. In this case, the memory 210 may be implemented as a memory embedded in the electronic apparatus 200 or as a memory detachable from the electronic apparatus 200 depending on the data storage purpose. For example, in the case of data for driving the electronic apparatus 200, the data may be stored in the memory embedded in the electronic apparatus 200, and in the case of data for the expansion function of the electronic apparatus 200, the data may be stored in a memory detachable from the electronic apparatus 200.

The memory 210 stores content. For example, the memory 210 may temporarily store content received via the communicator 230, which will be described below.

The memory 210 may store information related to a chatting service related to the content. The information related to the chatting service may include information regarding whether a chatting service corresponding to the content exists, and if so, may include address information or time information for providing the chatting service.

The memory 210 may store history information (or conversation history) provided by the chatting service during the performance of the chatting service.

The memory 210 may store keywords of interest of a user. The keywords of interest may be information regarding a particular object, information regarding a particular sport, information regarding a particular person, etc. For example, these keywords of interest may be used to determine whether the user is interested in a particular image.

The memory 210 may store layout information constituting the chatting service. The layout information may store information regarding the size position of each of the area where content is displayed, the area where the content of chatting is displayed, and the area where content of chat input is displayed. Such a layout may be set by the original manufacturer, and the size and position of the above-described windows for user manipulation may vary.

Accordingly, the layout form that has been changed according to the user's preference is stored in the memory 210, and the chatting service may be provided according to the layout form when providing the chatting service.

Meanwhile, the memory embedded in the electronic apparatus 200 may be implemented as at least one of a volatile memory (e.g. a dynamic RAM (DRAM), a static RAM (SRAM), or a synchronous dynamic RAM (SDRAM)) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g. a NAND flash or a NOR flash), a hard drive, or a solid state drive (SSD)), and the memory detachable from the electronic apparatus 200 may be implemented in the form of a memory card (e.g., a compact flash (CF), a secure digital (SD), a micro secure digital (Micro-SD), a mini secure digital (Mini-SD), an extreme digital (xD), or a multi-media card (MMC)), an external memory connectable to a USB port (e.g., a USB memory), or the like.

Meanwhile, in the above-illustrated example, the electronic apparatus 200 consists of a single memory, but it is also possible to describe that the electronic apparatus 200 includes a plurality of memories when referring to volatile and non-volatile memories separately.

The communicator 230 is configured to perform communication with various types of external devices according to various types of communication methods. The communicator 230 may include a Wi-Fi module, Bluetooth module, an infrared communication module, a wireless communication module, etc. Here, each communication module may be implemented in the form of at least one hardware chip.

The Wi-Fi module and the Bluetooth module may perform communication using a Wi-Fi method and a Bluetooth method, respectively. When using a Wi-Fi module or a Bluetooth module, various connection information such as SSID and session key are first transmitted and received, and various information can be transmitted and received after establishing communication connection using the same.

The infrared communication module performs communication according to an infrared Data Association (IrDA) communication technology which transmits data wirelessly over a short distance using infrared rays between optical light and millimeter waves.

The wireless communication module includes at least one communication chip that performs communication according to various wireless communication standards, such as Zigbee, 3rd Generation (3G), 3rd Generation Partnership Project (3GPP), Long Term Evolution (LTE), LTE advanced (LTE-A), 4th Generation (4G), 5th Generation (5G), etc.

In addition, the communicator 230 may include at least one of wired communication modules that perform communication using a local area network (LAN) module, an Ethernet module, a pair cable, a coaxial cable, an optical fiber cable, an ultrawide-band (UWB) module, etc.

According to an embodiment, the communicator 230 may utilize the same communication module (e.g., a Wi-Fi module) to communicate with external devices, such as a remote controller, and an external server.

According to another embodiment, the communicator 230 may utilize different communication modules (e.g., a Wi-Fi module) to communicate with external devices, such as a remote controller, and an external server. For example, the communicator 230 may utilize at least one of an Ethernet module or a Wi-Fi module to communicate with an external server, and may utilize a BT module to communicate with an external device such as a remote controller. However, this is only one embodiment, and the communicator 230 may utilize at least one of various communication modules when communicating with a plurality of external devices or external servers. Meanwhile, the remote controller described above may also allow a user to enter voice commands, select specific icons (or objects) on the displayed display, and the like. For example, the remote controller may perform mouse-like functions.

The communicator 230 may receive content. Here, the content may be real-time content, such as broadcast content provided by a broadcaster, streaming content, or VOD content provided by a VOD server. In addition, the corresponding content may be not only content that includes images, but also content that provides music while displaying images, game content, and the like.

In addition, the communicator 230 may receive information regarding a chatting service. Here, the information regarding the chatting service may be information such as whether a chatting service corresponding to content exists, and if so, the access address of the chatting service.

Further, the communicator 230 may receive service information. For example, the communicator 230 may include chat-related information (e.g., conversation information, additional information) provided by the chatting server 100. Here, the conversation information may include various texts, emoticons, content, etc. entered by users in the chat window, and additional information may be content generated by the server 100, such as poll content related to the content, information regarding objects included in the content, or information related to the content.

The display 240 may be implemented as various types of displays such as liquid crystal display (LCD), organic light emitting diodes (OLED) display, Plasma Display Panel (PDP), etc. The display 240 may also include a driving circuit that can be implemented in the form of Amorphous Silicon Thin-Film Transistor (a-si TFT), low temperature poly silicon Thin-Film Transistor (LTPS TFT), Organic Thin-Film Transistor (OTFT), etc., a backlight unit, etc. Meanwhile, the display 240 may be implemented as a touch screen combined with a touch sensor, a flexible display, a 3D display, etc.

The display 240 may display various images. For example, the display 240 may display an image generated by the processor 220. Such an image may be an image that corresponds to content, an image that includes text information indicating the presence of a chatting service along with the image, or an image that displays both an image and a chatting service. Various examples of screens that may be displayed on the display 240 will be described with reference to FIGS. 5, 7, to 13.

The input/output interface 260 may be any of the following interfaces: High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), or Digital Visual Interface (DVI).

The input/output interface 260 may input and output at least one of audio and video signals. According to an implementation example, the input/output interface 260 may include separate ports for inputting and outputting only audio signals and for inputting and outputting only video signals, or may be implemented as a single port for inputting and outputting both audio and video signals.

In addition, the input/output interface 260 may provide a video signal corresponding to the screen generated by the electronic apparatus 200, or an audio signal along with the corresponding video signal to an external device (e.g., a display device, STB, etc.).

The speaker 270 may output sound. Specifically, the speaker 270 may be a component that outputs various audio data processed by the input/output interface, as well as various notification sounds, voice messages, etc. The speaker 270 may also output result information corresponding to a voice recognition operation which will be described below.

The microphone 280 may receive the user's voice in an activated state. For example, the microphone 280 may be formed integrally with the electronic apparatus 200, such as on the top, front, or side surfaces. The microphone 280 may include various components such as a microphone that collects analog-type user voice, an amplification circuit that amplifies the collected user voice, an A/D conversion circuit that samples the amplified user voice and converts it into a digital signal, a filter circuit that removes noise components from the converted digital signal, etc.

When a user voice is input through such a microphone 280, the processor 220 may determine the content of the user voice and perform an operation corresponding to the content of the voice. Meanwhile, in the above description, a user voice is input through the microphone 280, but a microphone may be provided on a remote controller for controlling the electronic apparatus 200, and a user voice input through the microphone provided on the remote controller may be input and processed through the communicator 230 described above.

In addition, the electronic apparatus 200 may operate not only based on configuration or remote controller provided with the electronic apparatus 200, but also based on control commands from a user terminal device. For example, if the electronic apparatus is a TV or a set-top box, manufacturers have recently provided applications for controlling the TV or set-top box. These applications may provide functions that allow the user terminal device to be used as a remote controller for the electronic apparatus.

Meanwhile, through the chatting service, when a user voice is received via the microphone 280 described above, a user terminal device or a remote controller, the processor 220 may perform voice recognition regarding the received voice data and display the voice recognition results in a conversation window of the chatting service.

The processor 220 may perform overall control operations of the electronic apparatus 200. Specifically, the processor 220 functions to control the overall operations of the electronic apparatus 200.

The processor 120 may be implemented as a digital signal processor (DSP) for processing digital signals, a microprocessor, or a time controller (TCON), but is not limited thereto. The processor 120 may include one or more of a central processing unit (CPU), a micro controller unit (MCU), a micro processing unit (MPU), a controller, an application processor (AP), a graphics-processing unit (GPU), a communication processor (CP), and an ARM processor, or may be defined as the corresponding term.

In addition, the processor 220 may be implemented as a system on chip (SoC) with embedded processing algorithms, as a large scale integration (LSI), or as a field programmable gate array (FPGA). Further, the processor 220 may perform various functions by executing computer executable instructions stored in memory. While FIG. 2 illustrates that the electronic apparatus 200 includes only one processor, in an implementation, the electronic apparatus 200 may also include a plurality of processors (e.g., CPU+GPU, CPU+DSP).

The processor 220 may control the display 240 to display an image. For example, when a control command is entered by a user, the processor 220 may generate an image regarding content corresponding to the entered control command and control the display 240 to display the generated image.

When receiving a user's command to change channels, the processor 220 may generate an image using a broadcast signal corresponding to the channel regarding the input command, and control the display 240 to display the generated image. In this case, the processor 220 may process not only the image but also an audio signal, and control the speaker 270 to output the corresponding sound.

In this case, the processor 220 may determine whether there is a chatting service corresponding to the displayed image (or content). For example, the processor 220 may connect to the server 100 and identify whether there is a chatting service corresponding to the content.

Meanwhile, in an implementation, the processor 220 may periodically receive chatting service schedule information or the like from the server 100, and use the provided schedule information to determine whether a chatting service corresponding to the current content exists.

If a chatting service corresponding to the currently displayed image exists, the processor 220 may indicate that a chatting service related to the content exists.

Such a display operation may be performed when the presence of a chatting service is determined, but the processor 220 may also perform the above-described display operation at a specific point in time. For example, as a user navigates through multiple channels to find content of interest, the frequent indication that a chatting service is available may be inconvenient to the user. In this regard, the processor 220 may indicate that a chatting service corresponding to a particular piece of content exists if the user continues viewing the content for more than a predetermined amount of time.

Further, if the electronic apparatus 200 only indicates the presence of a chatting service, the user may be less inclined to participate in that chatting service. In addition, the user may feel uncomfortable being asked to participate in a chatting service for content that is not of particular interest to the user.

Accordingly, the electronic apparatus 200 according to an embodiment may not immediately indicate that a chatting service exists, but may instead display a message (or alarm) that includes a text that may be of interest to the user, such as when an image regarding content that may be of interest to the user is displayed. Such a message may be text information that includes a text in the form of a question. In this regard, the corresponding information may be referred to as nudge information or nudge notification.

When a chatting service related to the content exists based on the received data, the processor 220 may control to output an image corresponding to the content and an image including a highlighted time point identified based on at least one of the image corresponding to the content and the audio corresponding to the content and text information related to the content.

If a chatting service exists, the processor 220 may use at least one of the image and the audio data corresponding to the content to determine a highlighted time point. For example, the processor 220 may determine a highlighted time point based on whether the image includes an object of user interest, whether the audio data includes a predetermined sound, or whether the text information, which is a result of voice recognition regarding the audio data, includes a predetermined text. The detailed description regarding such operations will be provided later with reference to FIGS. 4 to 6.

Meanwhile, the processor 220 may control the communication device to obtain conversation information corresponding to the chatting service, and may use at least one of the frequency of conversations using the obtained conversation information, or whether a predetermined keyword is included, to identify a highlighted time point.

In addition, the processor 220 generates text information related to the content and the highlighted time point. For example, the processor 220 may generate the text information based on at least one of a keyword, type of content, an object of interest, or the text information included in the obtained conversation information. For example, in the case of using an object of interest, the processor 220 may obtain additional information related to the content based on broadcast information related to the content obtained via the communicator, and may determine whether the image includes an object of interest of the user based on the obtained additional information. Such an operation will be described below with reference to FIG. 5.

The processor 220 may control the display 240 to display the text information generated at the identified highlighted time point on the image. The text information may be in the form of a question.

By the above-described display, when the user selects the displayed text information or enters a command (e.g., a voice command) to execute the chatting service, the processor 220 may control the display 240 to display a UI (or chat window) related to the chatting service.

Here, the UI may include conversation information with other users viewing the content, and additional information obtained from a server providing the chatting service. The additional information may include a poll related to the content, information regarding an object included in the content, and the like.

The processor 220 may display the content and a chat window together using layout information prestored in the memory 210.

In addition, the processor 220 may control the display 240 to output the text information along with the image obtained from the external device at a highlighted time point while the image obtained from the external device is output to the display 240.

Meanwhile, although FIG. 3 illustrates that the electronic apparatus 200 includes a display, if the electronic apparatus 200 is a device such as a set-top box that does not include a display, the display configuration may be omitted. In addition, depending on the implementation, the above-described speaker and microphone may also be omitted. Furthermore, although not shown in FIG. 3, other configurations (e.g., cameras, human body detection sensors, etc.) may be included.

Figure 4:
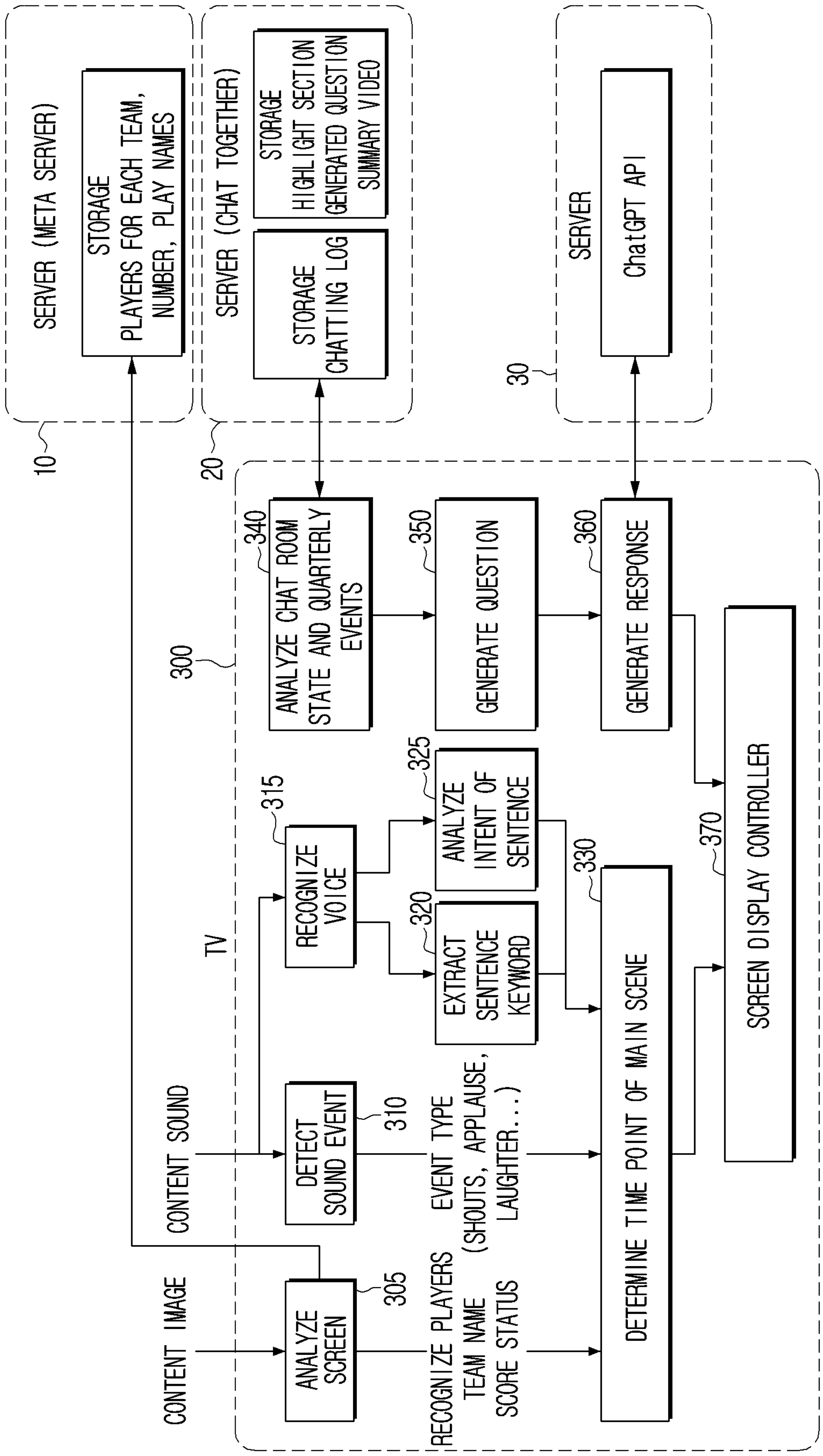
FIG. 4 is a view provided to explain a detailed operation of a processor according to an embodiment.

FIG. 4 is a view provided to explain a detailed operation of a processor according to an embodiment.

Referring to FIG. 4, an electronic apparatus 300 may receive content and determine whether it is the time of an event based on image/audio of the received content and conversation information of the chatting service.

The electronic apparatus 300 may analyze the screen of the input image to identify a specific object within the currently displayed image (e.g., in the case of an athletic event, an athlete's face or back number, a score, etc.) (305). For example, the electronic apparatus 300 may obtain information related to the current content via the server 10 and perform the image analysis described above using the obtained information. In the case of a sporting event, the obtained information may be information (names, back numbers, etc.) of athletes competing in the sport, and in the case of a drama or movie, the obtained information may be names of characters, names of actors appearing in the work, etc.

In addition, the electronic apparatus 300 may not only recognize static objects but also detect certain dynamic changes. For example, in the case of a baseball game, the electronic apparatus 300 may detect a batter's motion, such as a swing or a hit, in the case of a basketball game, a three-point shot, a scoring motion, a blocking motion, or the like, or in the case of a soccer game, a shooting motion, a goal motion, a foul motion, or the like. The above example assumes the case of sports, but in the case of content such as movies or dramas, it is also possible to detect the occurrence of accidents, situations such as shooting scenes, etc.

The electronic apparatus 300 may use the audio data of the content to determine the presence of a predetermined sound event in the audio data (310). For example, the electronic apparatus 300 may detect a batting sound, clapping, cheering, etc.

A user voice may be included in the audio data of the content, and the electronic apparatus 300 may identify a sentence 320, intent 325 or the like of the corresponding voice through voice recognition (315) of the corresponding voice.

In addition, the electronic apparatus 300 may determine when an event has occurred based on the conversation information within the chatting service, such as the update speed of text or whether a specific keyword appears in the chat window (340).

Based on such a conversation history of the chatting service, the operations of generating questions and answers corresponding to the event may be performed simultaneously (350, 360). The embodiment of utilizing the conversation history will be described below with reference to FIGS. 14 to 18.

The electronic apparatus 300 may identify whether an event has occurred by combining information confirmed in various ways as described above (370).

Here, there may be various event occurrence situations, for example, it may be determined that the above-described event has occurred when the user is not currently using the chatting service, but the situation is such that the chatting service may be induced, when the conversation in the current chat window is interrupted during the execution of the chatting service, when an argument occurs between the users participating in the chat window, or when the participants in the chat room leave the chat room, and so on. Meanwhile, the above-described situations are exemplary, and other situations may be utilized in addition to the above-described situations, and operations in each situation are described below with reference to FIG. 6.

Figure 5:
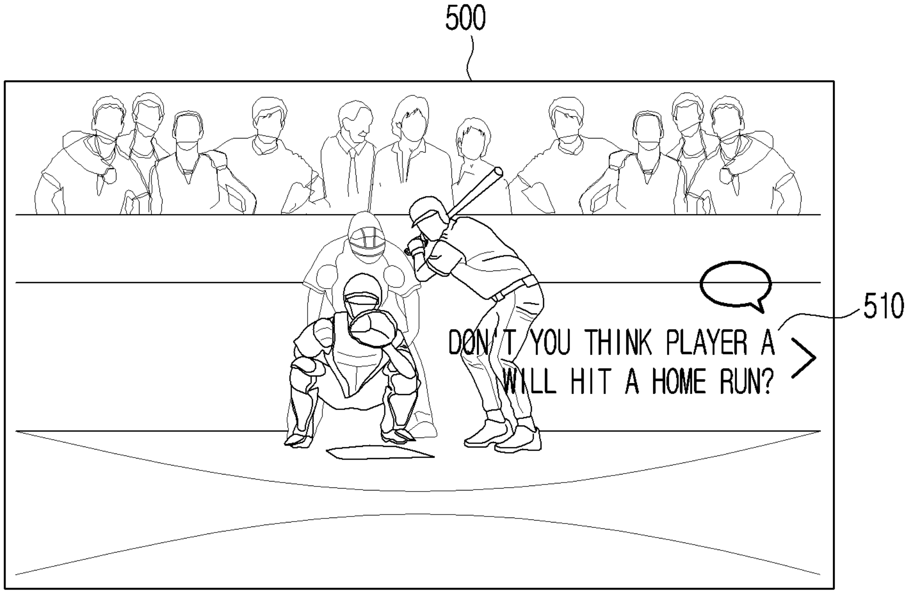
FIG. 5 is a view illustrating an example of a user interface window that may be displayed on a display according to an embodiment.

Referring to FIG. 5, an example of a notification message that is displayed in a situation where a user has not entered the chatting service in the above-described situation, but is highly likely to participate, is described.

FIG. 5 is a view illustrating an example of a user interface window that may be displayed on a display according to an embodiment.

Referring to FIG. 5, a user interface window 500 displays an image corresponding to the content and displays text information 510 along with the image. Such text information is a text generated by analyzing the content of the current image, and as shown in FIG. 5, the text is in the form of a question. In this regard, the above-described text information may be referred to as nudge information, nudge notification, or the like.

In addition, the user interface window 500 may display an icon (or image, e.g., a speech bubble, arrow, etc.) indicating that a chat is available along with the text information described above. Further, the above-described text information and icon may be displayed to be highlighted in a different thickness or color than the current image, such that the user may select the corresponding text information, etc.

Meanwhile, in an implementation, the above-described nudge may be provided in consideration of the user's preference. For example, if the user has a history of registering (or setting) a particular player (a particular team or a particular sport) as a preference, and a player preferred by the user is currently being displayed on the screen, it is determined as a highlighted time point, and the above-described text information may be displayed. In addition, the above-described highlighted time point may be various time points other than when the user's preferences are being displayed. In addition, the above-described user preferences may be stored on a unit of an electronic apparatus, and may be stored per user (or user account). For example, if player B is registered to a particular user account A, and the electronic apparatus is currently being used by user account A, the operation described above may be performed when player B is displayed in the image.

Meanwhile, FIG. 5 illustrates that the highlighted time point for displaying the text information described above is identified by analyzing an image input from the electronic apparatus 200. However, the above-described highlighted time point may not only be identified by the electronic apparatus 200, but may also be identified by an external device (i.e., the server 100), or may be identified using data utilized by the external device (i.e., chat window information).

For example, the server may perform image and/or audio analysis as described above to notify the electronic apparatus 200 that it is a highlighted time point, and the electronic apparatus 200 may display the above-described text information at the notified highlighted time point. In some implementations, the above-described text information may also be generated by the server 100.

Meanwhile, here, the highlighted time point may be not only a specific point in time, but also a period of time (e.g., a second or two, or a period where a certain situation persists) before or after the corresponding point in time. For example, a highlighted time point could be not only when a player of interest enters the batter's box, but also when the player remains in the box. Similarly, a period of time, such as when a batter gets a hit, but also when the batter is on base after the hit, may be considered a highlighted time point. In this sense, although it is referred to as a highlighted time point, it may also be referred to as a highlighted segment. we refer to highlighted moments, they may also be referred to as highlighted section.

As such, the present disclosure does not simply provide information that a chatting service is available, but also uses a text that may provoke the user's curiosity to inform the user that participation in the chatting service is possible, thereby increasing the likelihood of user participation.

FIG. 6 is a view provided to explain a display operation of different nudge information according to an embodiment.

Referring to FIG. 6, the situations in which nudge information is displayed may be categorized into the following four situations.

First, when there are no participants in the chat room or where there are no conversations.

Second, when there was a conversation between participants in the chat room, but it was interrupted.

Third, when participants are arguing while chatting with each other.

Fourth, when chat room participants leave during a match.

Meanwhile, although the present disclosure divides the situation for displaying nudge information into four situations, it may be divided into fewer situations that the above or may be divided into five or more situations.

Firstly, when there are no participants in the chat room, screen analysis may be performed to induce participation in the chat room (S615). For example, people objects may be extracted by semantic segmentation, letters and numbers may be extracted and recognized in the people area, or team names or score status may be recognized from dynamic actions (e.g., "a batter steps into the batter's box") or scoreboard.

Subsequently, based on the results of the above-described screen analysis, it may be determined whether the current situation is a main scene situation (S620). For example, in the case of sports content, it may be the time of predicting the record of a particular athlete, or in the case of a movie, it may be the situation of a particular event such as a shooting scene, a kissing scene, etc.

In the case of a main scene situation, text information corresponding to that point in time may be generated and displayed (S625). Meanwhile, although it is illustrated and described that such an operation is performed in the electronic apparatus 200, but in an implementation, it is configured such that the server 100 performs the screen analysis, analyzes the main scene time, and the like, generates a corresponding question, and provides the generated question to the electronic apparatus 200, and the electronic apparatus 200 performs only a display operation.

In the second situation, the chatting service may use an analysis of the chat room's conversation history to generate questions that may trigger participation in the chat room (S930). For example, the chatting service may determine that participation in the chat room is low by considering a trend of increase in the number of remote control inputs, a type of sentence (interrogative, declarative, exclamatory), a frequency of occurrence of interrogative sentences per unit of time, and the like.

In the above-described situation, within the recognized highlighted section of the content screen, items that the user may want to ask about may be presented in advance. For example, questions in sentence categories that include evaluations of players, coaches, and teams may be generated and displayed. Alternatively, matters related to poll content may be provided on the chat screen.

In the third situation, the chat conversation information may be analyzed to determine whether an argument between users has occurred (S635). Subsequently, questions corresponding to the argument may be generated, and answers may be generated and displayed. For example, a question may be generated by detecting a controversial part based on the chat log and extracting a prompt to obtain accurate information (S640), and when a certain number of user inputs (remote control inputs) are checked, the question may be asked to the AI (ChatGPT) and the answer may also be provided to the chat room (S645).

In the fourth situation, the electronic apparatus 300 may provide an entertainment element (poll) on the chat screen to maintain the conversation in the chat window (S650). An example of such a situation is shown in FIG. 18.

FIGS. 7 to 13 are views illustrating an example of a user interface window that may be displayed on an electronic apparatus according to an embodiment.

Figure 7:
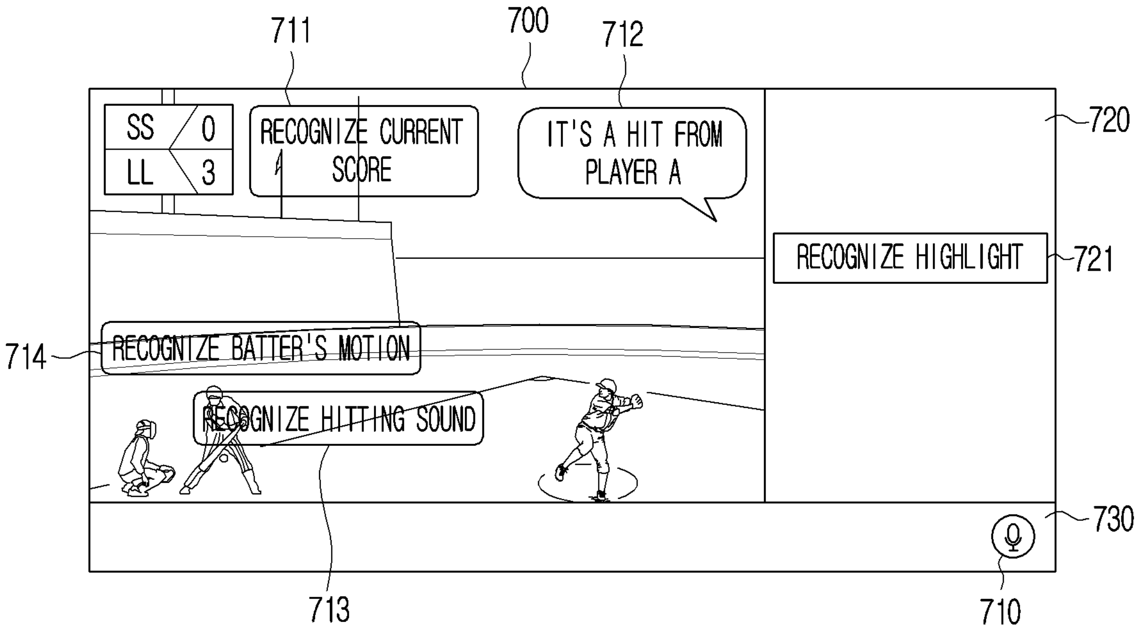
FIG. 7 is a view illustrating an example of a user interface window that may be displayed on an electronic apparatus according to an embodiment.

Referring to FIG. 7, a display screen 700 includes an area for displaying an image corresponding to the content the user was previously viewing, an area 720 for displaying the chat content, and an area 730 for entering a text in the chat window.

For example, the area 720 for displaying chat content may be an area that displays texts or conversations input by other users, not just the current user of the electronic apparatus, and the area 720 may display not only what the user has entered, but also questions generated by the server 100 or the electronic apparatus 200.

In addition, the above-described text may be inputted not only by a user directly, but also by using a voice recognition result for the inputted voice data through activation of a voice input icon 710 located in a text input area. Meanwhile, when the above-described voice input icon 710 is activated to receive the user's voice input, it may be received by using not only a microphone included in the electronic apparatus 100, but also through a device for controlling the electronic apparatus 100 (e.g., a remote controller or a user terminal device).

In such an environment, an operation of recognizing a highlighted section according to an embodiment is described. For example, through a screen analysis as illustrated, a current score 711 and a batter's motion 714 may be recognized, and through an analysis of audio data, whether a highlighted situation exists may be determined based on a batting sound, a caster's announcement 712, and the like.

Upon recognizing such a highlighted situation, the electronic apparatus 200 (or server 100) may generate text information corresponding to the highlighted situation. For example, in the above-described situation, if the user's chat participation is low, the electronic apparatus 200 or the server 100 may proactively display a question to encourage chat participation, as illustrated in FIG. 8.

Figure 8:
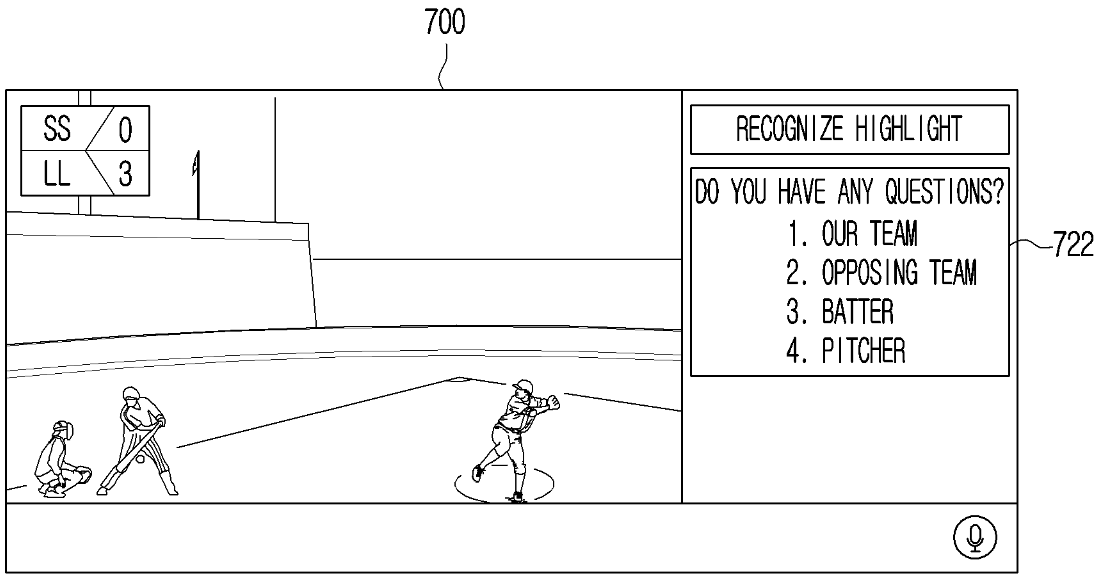
FIG. 8 is a view illustrating an example of a user interface window that may be displayed on an electronic apparatus according to an embodiment.

Referring to FIG. 8, FIG. 8 illustrates an example of displaying question information 722 to encourage users to participate in a chat when chat participation is not high. The question information described above may be generated and displayed directly by the electronic apparatus 200, or the question information may be generated by the server 100 and displayed in the chat window.

Specifically, it used to be that users would ask questions first and get answers later. However, this requires the users to know how to ask the questions or the process. However, in the present disclosure, the matters that the users may be curious about or want to ask are presented in advance and thus, the users may easily obtain the necessary information from the question information that the chat system displays in the chat window.

Figure 9:
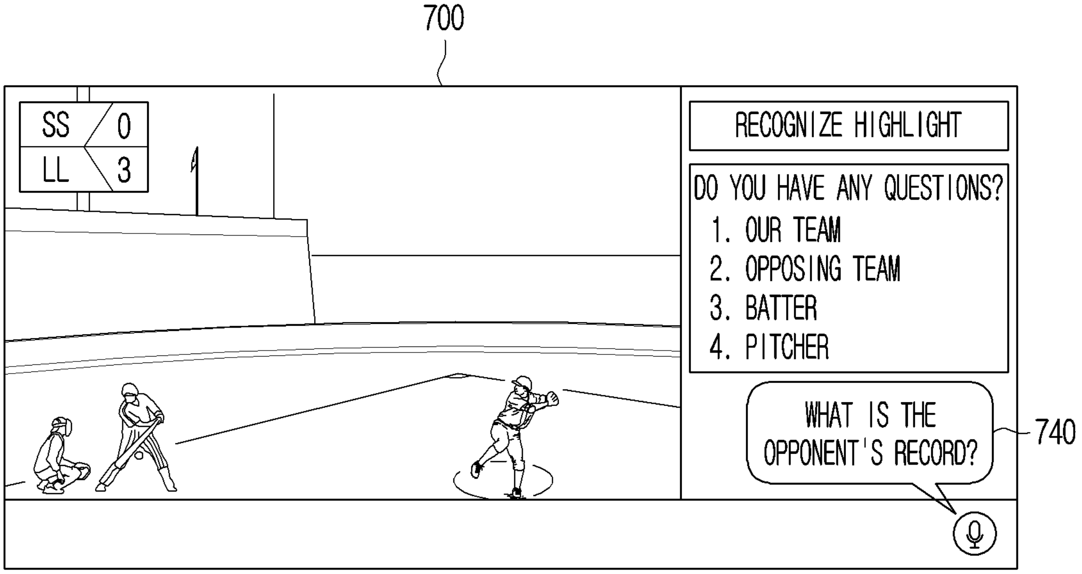
FIG. 9 is a view illustrating an example of a user interface window that may be displayed on an electronic apparatus according to an embodiment.

FIG. 9 illustrates an operation performed when a user enters a question 740 by voice if the question information is displayed as in FIG. 8.

Figure 10:
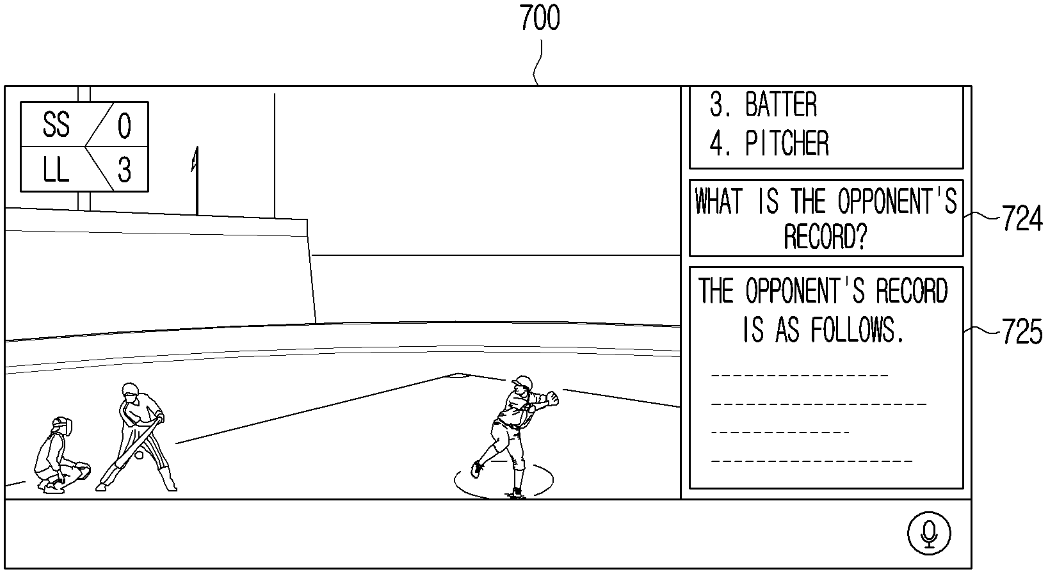
FIG. 10 is a view illustrating an example of a user interface window that may be displayed on an electronic apparatus according to an embodiment.

As illustrated in FIG. 9, the user may select a voice icon to ask a question by voice, and the electronic apparatus 200 may verify the question through voice recognition. In response to such a question, the electronic apparatus 200 may display response information 725 in the chat window as shown in FIG. 10 which will be described below.

Meanwhile, in the illustrated example, the answers to the above questions are shown as texts only, but in an implementation, they may be provided as content such as image or audio.

Figure 11:
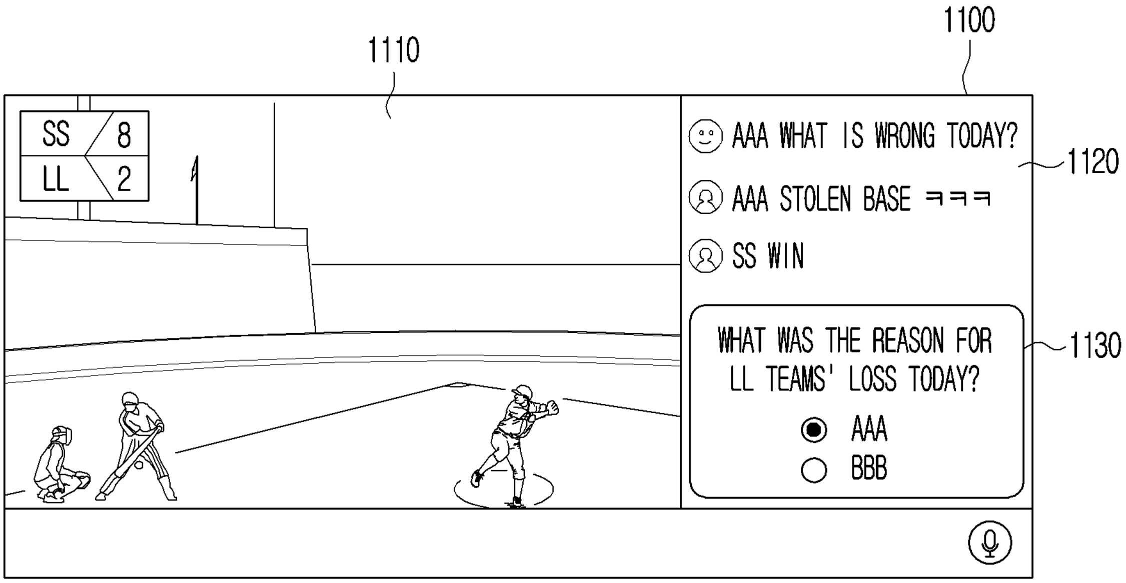
FIG. 11 is a view illustrating an example of a user interface window that may be displayed on an electronic apparatus according to an embodiment.

Referring to FIG. 11, the user interface window may provide poll content 1130 along with conversation history 1120.

Such poll content items may be generated from the conversation history 1120, if there are a lot of complaints regarding a particular player as illustrated, the poll content may be generated by reflecting the corresponding player.

Figure 12:
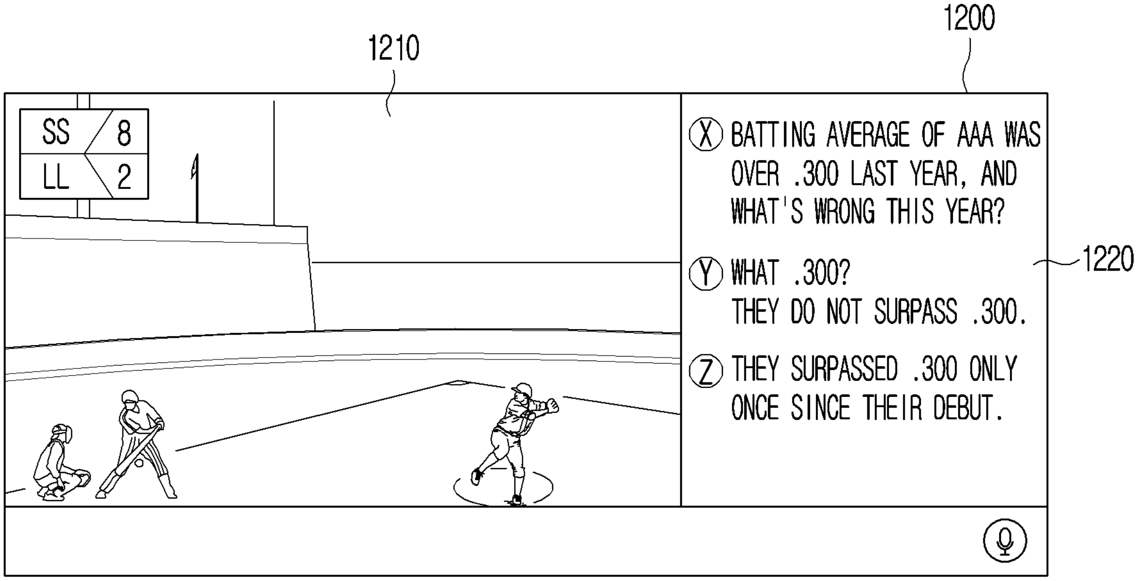
FIG. 12 is a view illustrating an example of a user interface window that may be displayed on an electronic apparatus according to an embodiment.
Figure 13:
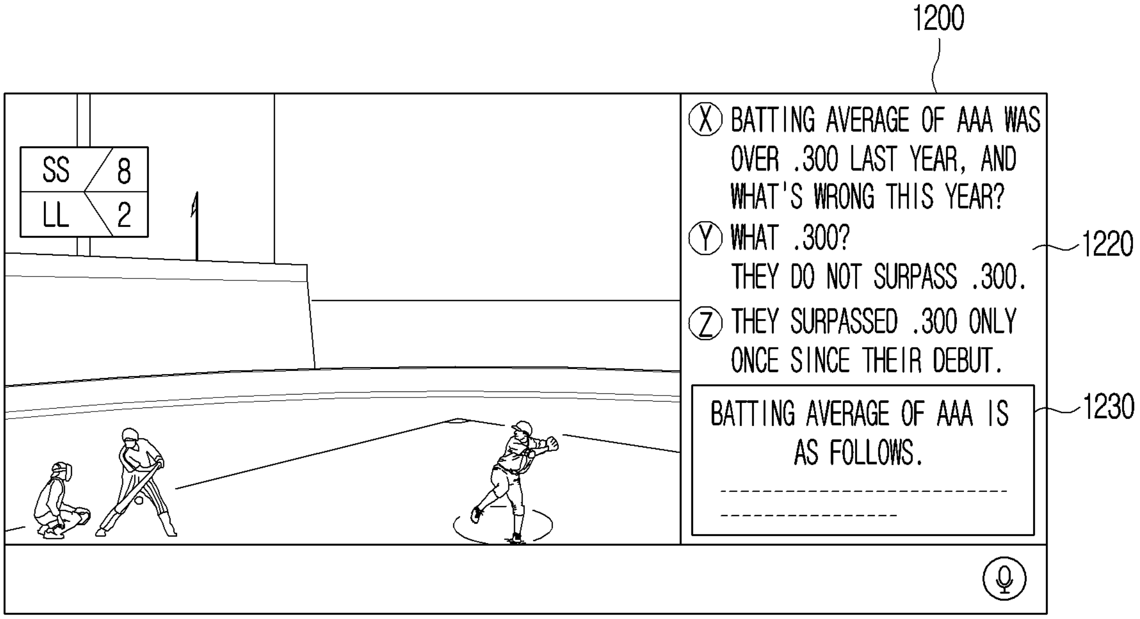
FIG. 13 is a view illustrating an example of a user interface window that may be displayed on an electronic apparatus according to an embodiment.

Referring to FIGS. 12 and 13, a user interface window 1200 includes an area 1210 for displaying an image corresponding to content and an area 1220 for displaying conversation.

When multiple users assert different opinions about a particular situation, the server 100 may generate questions based on the users' conversations, and generate and display answers 1230 to the generated questions.

As such, the chat system asks questions that many users may have in the chat window in advance and provide answers to the questions and thus, the chat participants are able to get information with fewer choices, thereby improving user convenience.

Meanwhile, the above-described determination of the occurrence of an argument may also be based on the chat history of the entire chat section, and the above-described operation may be performed when the chat history within a certain time period is utilized, or when more than a predetermined percentage of chats occur in the entire chat section. More specific operations will be described below with reference to FIGS. 14 to 18.

FIG. 14 is a view illustrating an example of a conversation history according to an embodiment.

Referring to FIG. 14, the electronic apparatus 200 or the server 100 may store the various texts (or utterances) 1410 posted to the chat window as shown in FIG. 14, and categorize and store the nature of each text 1420.

The nature of the texts may be whether the user's utterance in response to the corresponding text is a question or not, and if the user's utterance is a question, whether the question is about a specific object, a specific situation, or a specific point in time.

This categorization may be performed using statistical and rule-based methods.

Firstly, when a statistical method is used, the user's texts may be categorized as follows.

The text sentences may be converted to a vector form through word embedding and used as input vectors for an AI model. As a result, the output results of the AI model may be the results for each text as described above.

In addition, when a rule-based method is used, rules may be created by using dictionaries and regular expressions including entity names and keywords. The type of texts may be categorized by determining whether the input sentences satisfy the conditions of a rule.

The operation of identifying whether an argument occurs in case where a look-up table as in FIG. 14 is created through such categorization will be described below.

Firstly, once the content and type of each text is identified, an argument time point event may occur when the number of question-like utterances is equal to or greater than a threshold value in a unit of time.

An event occurs if V>Threshold (V: number of times a question-like utterance occurs in unit time)

V=ΣWDA/T, during T,

WDA=1 if DA [HOW, WHO, WHY, ASK, WHAT, WHEN]

WDA=0 if DA [PLAIN]

The operation for generating a question, when the above-described event occurs, and generating an answer thereto will be described with reference to FIG. 15.

Referring to FIG. 15, questions which are posted more than a predetermined number of times in the prestored conversation history may be organized as shown in FIG. 15, and a lookup table including text content 1510, question type 1520, and question object 1530 may be generated.

For example, in order to generate the above-described lookup table, the server 100 may utilize modules such as a classifier to determine the user request, an extractor to extract object names from the corresponding text, and a question generator to synthesize the information described above to generate a final question.

The operation of generating answers using questions described above is shown in FIG. 16.

FIG. 16 is a view provided to explain an example of generating response information according to an embodiment.

Referring to FIG. 16, based on matters 1610, 1620, 1630 related to a question, corresponding response information 1640 may be generated using a natural language answer.

The matters related to a question described above may correspond to the lookup table of FIG. 15. For example, UA 1610 is information regarding the type of question, NE 1620 is an item for object information corresponding to the question, and query template 1630 is a question based on the UA and NE described above.

An example of generating answers is as follows. After selecting a query template that meets the conditions of the detected UA and NE from the table below, an answer to provide information may be generated after additionally obtaining necessary information from the NE or a separate search DB.

The above describes the operation of identifying an argument situation using only the conversation content in the chat window and identifying the question and answer content accordingly. However, in an implementation, it is possible to perform the above operation using not only the conversation content but also the screen situation. This will be described below with reference to FIG. 17.

Referring to FIG. 17, the conversation history of the chat room is analyzed (1710). For example, it may be determined whether a particular object (or person, object) is frequently mentioned in the chat room and whether the particular object is displayed in the corresponding image by analyzing the corresponding image (1720). Such analysis may include determining whether the image includes an image corresponding to the particular object, or whether the voice data includes keywords for the particular object, and combining the chat information and the image analysis results described above to determine whether an event related to a particular user has occurred.

FIG. 18 is a view illustrating examples of poll content generated based on screen information and keyword information according to an embodiment.

FIG. 18 illustrates an example of poll content that combines chat window keywords and screen recognition results, but in an implementation, the poll content may be generated using only chat window keywords or using only screen recognition results.

As shown above, the method according to the present disclosure may encourage participation in a chatting service by recognizing key sections of viewed content, and asking questions regarding matters that users may want to know in advance or providing various content that encourages the users to participate in the conversation according to the situation of the chat window.

Figure 19:
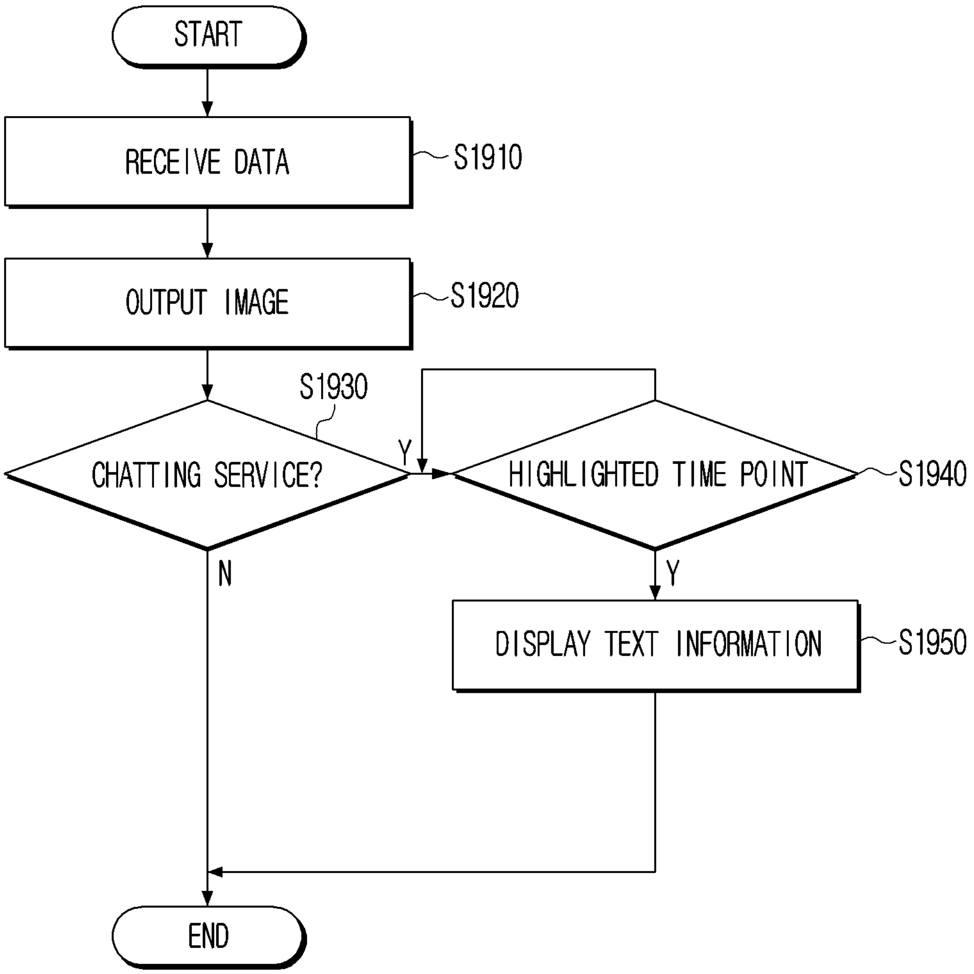
FIG. 19 is a view provided to explain a control operation of an electronic apparatus according to an embodiment.

FIG. 19 is a view provided to explain a control operation of an electronic apparatus according to an embodiment.

Referring to FIG. 19, the electronic apparatus 200 receives content (S1910). Such content may be broadcast content, live streaming content, or video-on-demand content.

The electronic apparatus 200 generates and outputs an image corresponding to the content (S1920). For example, in response to receiving content, image and/or audio corresponding to the received content may be generated and output.

Meanwhile, if the above-described electronic apparatus includes a display, the generated image may be displayed on the corresponding display. If the electronic apparatus performing the above-described operation is connected to another electronic apparatus including a display, the generated image may be output to the another electronic apparatus so that the above-described image may be displayed on the another electronic apparatus.

The electronic apparatus 200 identifies a chatting service related to the generated image (S1930). For example, the electronic apparatus 200 may identify whether a chatting service related to the generated image exists by providing information regarding the generated content to the server, or by obtaining schedule information regarding the chatting service from the server.

When there is the chatting service, an image including a highlighted time point identified based on at least one of the image corresponding to the content and the audio corresponding to the content and text information related to the content, may be output.

Specifically, when the chatting service exists, the highlighted time point is identified using at least one of the image or the audio data corresponding to the content (S1940).

For example, the highlighted time point may be identified based on whether the image includes an object of user interest, whether the audio data includes a predetermined sound, and whether the text information that is the result of voice recognition for the audio data includes a predetermined text.

Alternatively, conversation information corresponding to the chatting service may be obtained, and the highlighted time point may be identified using at least one of the frequency of the conversation using the obtained conversation information or whether a predetermined keyword is included.

Alternatively, broadcast information related to the content may be identified, additional information related to the content may be obtained based on the identified broadcast information, and a highlighted time point may be identified by checking whether the image includes an object of user interest based on the obtained additional information.

In addition, the generated text information may be displayed at the highlighted time point described above (S1950). For example, text information may be generated based on at least one of keywords, types of content, objects of interest, or text information included in the obtained conversation information, and may be displayed at the highlighted time point described above. Such text information may include text in the form of a question.

Subsequently, when text information is selected or a command to execute the chatting service is input, a UI corresponding to the chatting service may be output along with the image. Here, the UI may include conversation information of other users viewing the content and additional information obtained from the server providing the chatting service. The additional information may be a poll related to the content, information regarding an object included in the content, etc.

Figure 20:
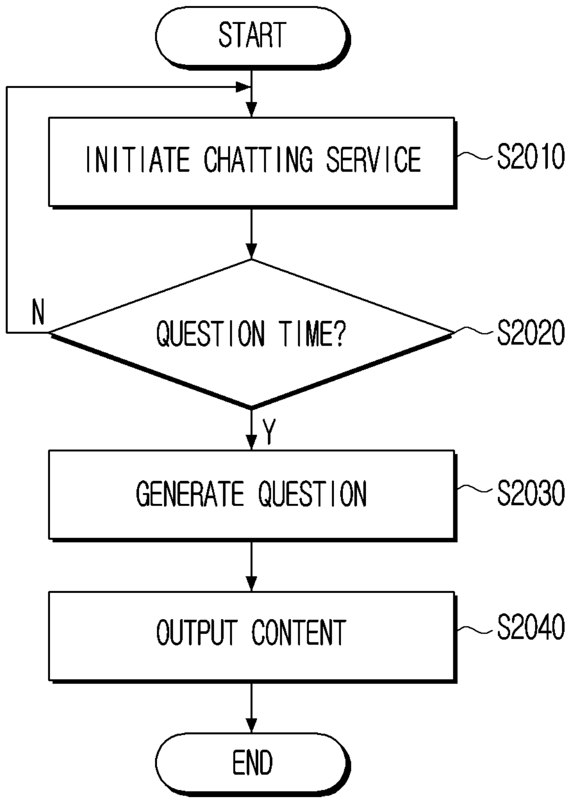
FIG. 20 is a view provided to explain a control operation of a server according to an embodiment.

FIG. 20 is a view provided to explain a control operation of a server according to an embodiment.

Referring to FIG. 20, the server 100 may initiate a chatting service corresponding to content (S2010). For example, if the content is real-time content, the chatting service may be initiated in response to the broadcast time of the content.

Subsequently, by analyzing chat information within the chatting service or chat content corresponding to the chatting service, the server 100 may determine whether the service needs to intervene (S2020). For example, if the frequency of chats within the chat window is low, the users are leaving, or the users are having arguments with each other, it may be determined that intervention is necessary.

Meanwhile, when it is determined that intervention is necessary, the server 100 may generate a question corresponding to the situation (S2030), obtain response information corresponding to the question, and display the response information in a chat window (S2040). The above operations may be performed in a single device, but in an implementation, may be performed using multiple devices. In other words, the above-described question may be generated in a first server, the above-described question may be provided to a second server to obtain response information, and the obtained response information may be displayed in a chat window.

Meanwhile, the methods according to the various embodiments of the disclosure described above may be implemented in the form of an application which may be installed on a conventional electronic apparatus.

In addition, the methods according to the various embodiments of the disclosure described above may be implemented only by software upgrade or hardware upgrade of the conventional electronic apparatus.

In addition, methods according to at least some of the various embodiments of the disclosure described above may be performed through an embedded server included in the electronic apparatus, or at least one external server of the electronic apparatus.

Meanwhile, according to an embodiment, the above-described various embodiments may be implemented in software including an instruction stored in a machine-readable storage medium that can be read by a machine (e.g., a computer). A machine may be a device that invokes the stored instruction from the storage medium and be operated based on the invoked instruction, and may include a display device (e.g., display device (A)) according to embodiments. In case that the instruction is executed by the processor, the processor may directly perform a function corresponding to the instruction or other components may perform the function corresponding to the instruction under the control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium. For example, the 'non-transitory' storage medium may include a buffer that temporarily stores data. According to an embodiment, the methods according to the various embodiments described above may be included and provided in a computer program product. The computer program product may be traded as a product between a seller and a purchaser. The computer program product can be distributed in the form of a storage medium that is readable by machines (e.g.: a compact disc read only memory (CD-ROM)), or distributed directly on-line (e.g.: download or upload) through an application store (e.g.: Play Store™), or between two user devices (e.g.: smartphones). In the case of on-line distribution, at least a portion of a computer program product (e.g.: a downloadable app) may be stored in a storage medium readable by machines such as the server of the manufacturer, the server of the application store, or the memory of the relay server at least temporarily, or may be generated temporarily.

Various embodiments according to the present disclosure may be implemented in software including an instruction stored in a machine-readable storage medium (e.g., computers). A machine may be a device that invokes the stored instruction from the storage medium and is operable based on the invoked instruction, and may include the electronic apparatus (e.g., server 100) according to embodiments disclosed herein.

In case that the instruction is executed by the processor, the processor may directly perform a function corresponding to the instruction using other components under the control of the processor. The instruction may include codes provided or executed by a compiler or an interpreter.

In the above description, preferred embodiments of the present disclosure have been illustrated and described, but the present disclosure is not limited thereto and variously modifications may be made therein by those of ordinary skill in the art without departing from the gist of the disclosure as claimed in the accompanying claims. These modifications should not be understood separately from the technical spirit or prospect of the disclosure.

What is claimed is:

1. An electronic apparatus comprising:

a communicator configured to receive data corresponding to content;

a memory; and at least one processor configured to:

based on a chatting service being present that is related to the content included in the data received through the communicator and a user interface (UI) corresponding to the chatting service not being currently provided, control outputting of an image including text information related to the content upon detecting at least one of an image corresponding to the content and an audio corresponding to the content included in the data received through the communicator, wherein the image including text information is output at a highlighted time point that is identified based on the detecting of the at least one of the image corresponding to the content and the audio corresponding to the content.

2. The electronic apparatus as claimed in claim 1, wherein the at least one processor is configured to identify the highlighted time point based on whether the image includes an object of interest of a user, whether the audio includes a predetermined sound, and whether the text information which is obtained by voice recognition of the audio includes a predetermined text.

3. The electronic apparatus as claimed in claim 2, wherein the at least one processor is configured to identify the highlighted time point using at least one of a conversation frequency based on conversation information corresponding to the chatting service obtained through the communicator or whether a predetermined keyword is included.

4. The electronic apparatus as claimed in claim 3, wherein the at least one processor is configured to obtain the text information based on at least one of a keyword included in the conversation information corresponding to the chatting service obtained, a type of the content, the object of interest, or whether the text information is associated with the conversation information.

5. The electronic apparatus as claimed in claim 4, wherein the at least one processor is configured to:

obtain additional information related to the content based on broadcast information related to the content corresponding to the data received through the communicator; and identify whether the image includes an object of interest of a user based on the obtained additional information.

6. The electronic apparatus as claimed in claim 1, wherein the at least one processor is configured to:

based on a user input corresponding to selection of the text information or a user input corresponding to execution of the chatting service being received, control to output a UI corresponding to the chatting service with the image.

7. The electronic apparatus as claimed in claim 6, wherein the UI includes conversation information of another user viewing the content and additional information obtained from a server providing the chatting service.

8. The electronic apparatus as claimed in claim 7, wherein the additional information includes at least one of a poll related to the content or information regarding an object included in the content.

9. The electronic apparatus as claimed in claim 1, wherein the text information includes a text in a form of a question.

10. The electronic apparatus as claimed in claim 1, further comprising:

a display, wherein the at least one processor is configured to control the display to output the text information at the highlighted time point while an image obtained from an external device is being output on the display with the image obtained from the external device.

11. A controlling method of an electronic apparatus comprising:

receiving data corresponding to content; and based on a chatting service being present that is related to the content corresponding to the data received and a user interface (UI) corresponding to the chatting service not being currently provided, outputting an image including text information related to the content upon detecting at least one of an image corresponding to the content and an audio corresponding to the content, wherein the image including text information is output at a highlighted time point that is identified based on the detecting of the at least one of the image corresponding to the content and the audio corresponding to the content.

12. The controlling method as claimed in claim 11, further comprising:

identifying the highlighted time point based on whether the image includes an object of interest of a user, whether the audio includes a predetermined sound, and whether the text information obtained by voice recognition of the audio includes a predetermined text, wherein the identifying of the highlighted time point comprises identifying the highlighted time point using at least one of a conversation frequency based on conversation information corresponding to the chatting service or whether a predetermined keyword is included.

13. The controlling method as claimed in claim 12, further comprising:

obtaining the text information based on at least one of a keyword included in the conversation information corresponding to the chatting service, a type of the content, the object of interest, or whether the text information is associated with the conversation information.

14. The controlling method as claimed in claim 13, further comprising:

obtaining additional information related to the content based on broadcast information related to the content obtained through a communicator; and identifying whether the image includes an object of interest of a user based on the obtained additional information.

15. A non-transitory computer readable recording medium that stores a program for executing a controlling method of an electronic apparatus, the controlling method comprises:

receiving data corresponding to content; and based on a chatting service being present that is related to the content corresponding to the data received and a user interface (UI) corresponding to the chatting service not being currently provided, outputting an image including text information related to the content upon detecting at least one of an image corresponding to the content and an audio corresponding to the content, wherein the image including text information is output at a highlighted time point that is identified based on the detecting of the at least one of the image corresponding to the content and the audio corresponding to the content.

* * * * *